United States Patent
Park et al.

(10) Patent No.: US 11,714,960 B2
(45) Date of Patent: Aug. 1, 2023

(54) SYNTACTIC ANALYSIS APPARATUS AND METHOD FOR THE SAME

(71) Applicants: HYUNDAI MOTOR COMPANY, Seoul (KR); KiA MOTORS CORPORATION, Seoul (KR); HYUNDAI AUTOEVER CORP., Seoul (KR); SEOUL NATIONAL UNIVERSITY R&DB FOUNDATION, Seoul (KR)

(72) Inventors: Sung Soo Park, Incheon (KR); Chang Woo Chun, Suwon-si (KR); Chan Ill Park, Seoul (KR); Su Hyun Park, Seoul (KR); Jung Kuk Lee, Seoul (KR); Hyun Tae Kim, Seoul (KR); Sang goo Lee, Seoul (KR); Kang Min Yoo, Gwangmyeong-si (KR); You Hyun Shin, Seoul (KR); Ji Hun Choi, Bucheon-si (KR); Sang Hwan Bae, Seoul (KR)

(73) Assignees: HYUNDAI MOTOR COMPANY, Seoul (KR); KIA MOTORS CORPORATION, Seoul (KR); HYUNDAI AUTOEVER CORP., Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 215 days.

(21) Appl. No.: 16/901,437

(22) Filed: Jun. 15, 2020

(65) Prior Publication Data
US 2021/0182482 A1  Jun. 17, 2021

(30) Foreign Application Priority Data
Dec. 12, 2019 (KR) .................. 10-2019-0165929

(51) Int. Cl.
*G06F 40/211* (2020.01)
*G10L 25/30* (2013.01)

(52) U.S. Cl.
CPC .......... *G06F 40/211* (2020.01); *G10L 25/30* (2013.01)

(58) Field of Classification Search
None
See application file for complete search history.

(56) References Cited

U.S. PATENT DOCUMENTS 10,515,625 B1 * 12/2019 Metallinou .......... G10L 15/197
10,679,150 B1 *  6/2020 Larson ................. G06N 3/044
10,783,433 B1 *  9/2020 Proshin ................ G06N 3/08
(Continued)

*Primary Examiner* — Fariba Sirjani
(74) *Attorney, Agent, or Firm* — McDonnell Boehnen Hulbert & Berghoff LLP

(57) ABSTRACT

A syntactic analysis apparatus according to an embodiment of the present disclosure may include an input device receiving a phrase uttered from a user, and a learning device performing at least one or more of extension of an intent output layer for classifying an utterance intent of the user from the uttered phrase and extension of a slot output layer for classifying a slot including information of the phrase and extending a pre-generated utterance syntactic analysis model, such that the uttered phrase is classified into the extended intent output layer and the extended slot output layer, thereby broadly classifying an intent and a slot for the phrase uttered from a user.

9 Claims, 8 Drawing Sheets

(56) References Cited

U.S. PATENT DOCUMENTS

| | | | |
|---|---|---|---|
| 11,068,939 B1* | 7/2021 | Tcheng | G06N 3/04 |
| 11,245,646 B1* | 2/2022 | Koukoumidis | H04L 67/75 |
| 11,494,561 B2* | 11/2022 | Shazeer | G06N 3/045 |
| 2019/0171936 A1* | 6/2019 | Karras | G06N 3/084 |
| 2020/0043480 A1* | 2/2020 | Shen et al. | G10L 15/1815 |
| | | | 704/243 |
| 2020/0125930 A1* | 4/2020 | Martin | G06N 3/082 |
| 2020/0184960 A1* | 6/2020 | Suzuki | G06N 7/005 |

* cited by examiner

SYNTACTIC ANALYSIS APPARATUS AND METHOD FOR THE SAME

CROSS REFERENCE TO RELATED APPLICATIONS

This application claims the benefit of priority to Korean Patent Application No. 10-2019-0165929, filed in the Korean Intellectual Property Office on Dec. 12, 2019, the entire contents of which are incorporated herein by reference.

TECHNICAL FIELD

The present disclosure relates to a syntactic analysis apparatus and a method therefore.

BACKGROUND

A syntactic analysis apparatus learns utterance sentences through an artificial neural network based on a learning corpus including sentences uttered from a user and generates a syntactic analysis model. Moreover, the syntactic analysis apparatus may classify which intent the utterance sentence has, through a syntactic analysis model and may classify the classified result into defined slots. Herein, the learning corpus may include sentences and words that are used within a specified field determined by a designer.

For example, when a sentence saying that 'please make a call to Hong Gil dong' is entered, the syntactic analysis apparatus may classify the utterance intent as 'making a call' and may classify 'Hong Gil Dong' as a conversation counterpart, through the syntactic analysis model. However, because the syntactic analysis model may classify intents and slots for only the specified fields, when the utterance sentence is out of the specified field, it is difficult to classify the intents and the slots through the syntactic analysis model.

SUMMARY

The present disclosure has been made to solve the above-mentioned problems occurring in the prior art while advantages achieved by the prior art are maintained intact.

An aspect of the present disclosure provides a syntactic analysis apparatus that may extend the function of the generated syntactic analysis model by expanding an output layer and constructing and learning a new learning corpus for the extended output layer, and a method therefore.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a syntactic analysis apparatus includes an input device receiving a phrase uttered from a user and a learning device performing at least one or more of extension of an intent output layer for classifying an utterance intent of the user from the uttered phrase and extension of a slot output layer for classifying a slot including information of the phrase and extending a pre-generated utterance syntactic analysis model such that the uttered phrase is classified into the extended intent output layer and the extended slot output layer.

The learning device adds a neuron based on the utterance intent of the user to be classified from the uttered phrase to extend the intent output layer.

The learning device performs learning based on a new learning corpus to extend the pre-generated utterance syntactic analysis model.

The new learning corpus includes a part of information extracted from a pre-generated learning corpus and a learning corpus for learning the added neuron.

The learning device is performed such that a learning speed of the added neuron among a plurality of neurons included in the intent output layer is faster than a learning speed of a pre-generated neuron.

The learning device adds the neuron based on the slot to be classified from the uttered phrase to extend the slot output layer.

The learning device performs learning based on a new learning corpus to extend the pre-generated utterance syntactic analysis model.

The new learning corpus includes a part of information extracted from a pre-generated learning corpus and a learning corpus for learning the added neuron.

The learning device further includes an input layer into which a vector value obtained by converting the uttered phrase is entered.

According to an aspect of the present disclosure, a syntactic analysis method includes receiving a phrase uttered from a user, performing at least one or more of extension of an intent output layer for classifying an utterance intent of the user from the uttered phrase and extension of a slot output layer for classifying a slot including information of the phrase, and extending a pre-generated utterance syntactic analysis model such that the uttered phrase is classified into the extended intent output layer and the extended slot output layer.

The performing includes adding a neuron based on the utterance intent of the user to be classified from the uttered phrase to extend the intent output layer.

The extending of the pre-generated utterance syntactic analysis model includes performing learning based on a new learning corpus to extend the pre-generated utterance syntactic analysis model.

The new learning corpus includes a part of information extracted from a pre-generated learning corpus and a learning corpus for learning the added neuron.

The extending of the pre-generated utterance syntactic analysis model includes performing learning such that a learning speed of the added neuron among a plurality of neurons included in the extended intent output layer is faster than a learning speed of a pre-generated neuron.

The performing includes adding the neuron based on the slot to be classified from the uttered phrase to extend the slot output layer.

The extending of the pre-generated utterance syntactic analysis model includes performing learning based on a new learning corpus to extend the pre-generated utterance syntactic analysis model.

The new learning corpus includes a part of information extracted from a pre-generated learning corpus and a learning corpus for learning the added neuron.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
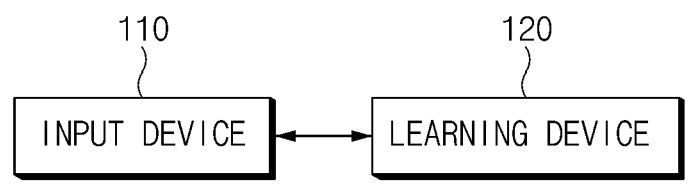
FIG. 1 is a diagram illustrating a configuration of a syntactic analysis apparatus, according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a diagram illustrating a configuration of a syntactic analysis apparatus, according to an embodiment of the present disclosure.

As illustrated in FIG. 1, a syntactic analysis apparatus 100 of the present disclosure may include an input device 110 and a learning device 120.

The input device 110 may receive the utterance of a user. For example, the input device 110 may be implemented with a microphone.

The learning device 120 may include an input layer 121, a hidden layer 122, and an output layer 123 or 124. The detailed descriptions refer to FIG. 2.

Figure 2:
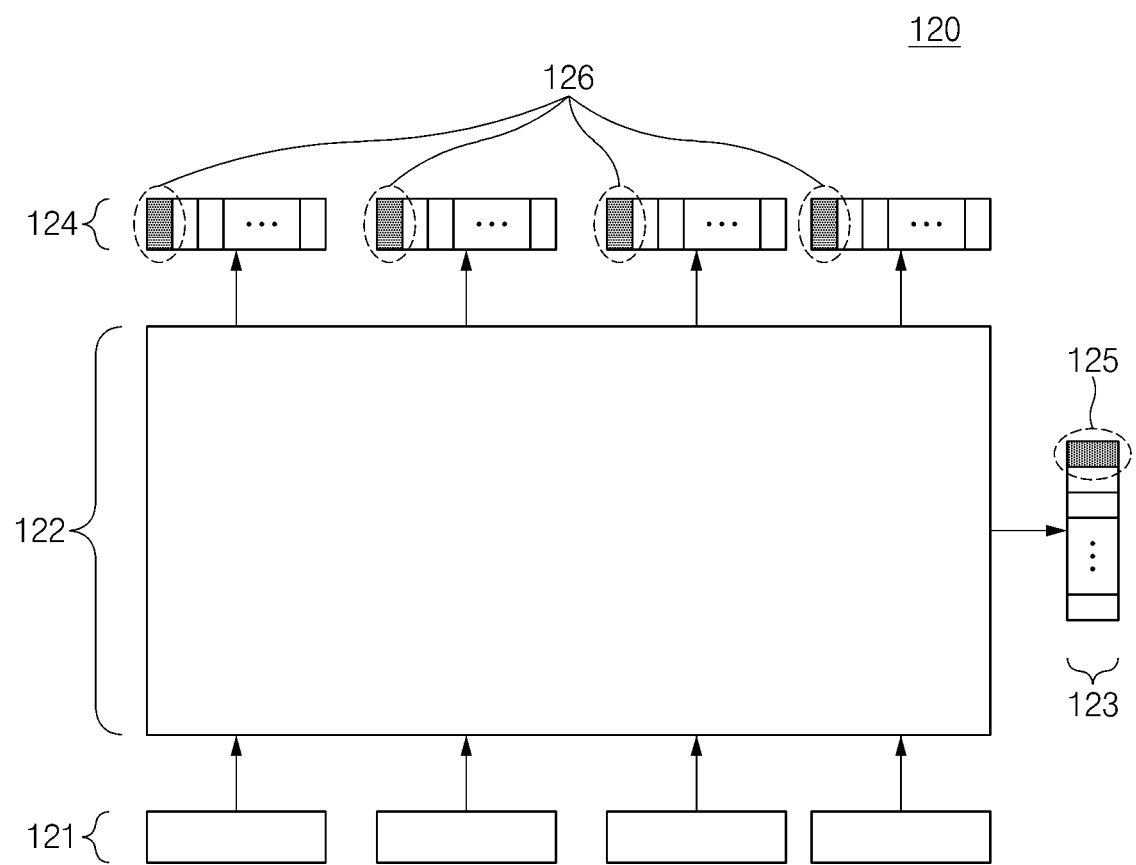
FIG. 2 is a diagram schematically illustrating a learning device in a state where an output layer is extended, according to an embodiment of the present disclosure.

FIG. 2 is a diagram schematically illustrating a learning device in a state where an output layer is extended, according to an embodiment of the present disclosure.

As illustrated in FIG. 2, the learning device 120 may receive the utterance of a user from the input layer 121 or may receive a learning corpus. Herein, the learning corpus may include sentences, words, or the like used in the specific field specified by an analysis model designer and may include phrases uttered by a user.

The learning device 120 may generate an utterance syntactic analysis model for learning phrases entered into the input layer 121, in the hidden layer 122. According to an embodiment, the learning device 120 may learn the phrases entered from the hidden layer 122 to the input layer 121 by using an artificial neural network and then may generate the utterance syntactic analysis model. For example, the artificial neural network may use gradient decent from an object function and may control the amount of learning or learning speed by adjusting the learning rate.

The learning device 120 may classify the utterance intent of the user and slot, which are entered to the input layer 121 through the extended intent output layer 123 and the extended slot output layer 124. Herein, the learning device 120 may add a neuron 125 based on the utterance intent of the user to be classified from the uttered phrase, may extend the intent output layer, and may generate the extended intent output layer 123. Furthermore, the learning device 120 may add a neuron 126 based on a slot to be classified as the uttered phrase, may extend the slot output layer, and may generate the extended slot output layer 124. Herein, the slot may mean an analysis item of a word and may be set in advance as an item to be classified by an analysis model designer. According to an embodiment, the slot may include 'who', 'date', 'time', 'place', and the like.

Figure 3:
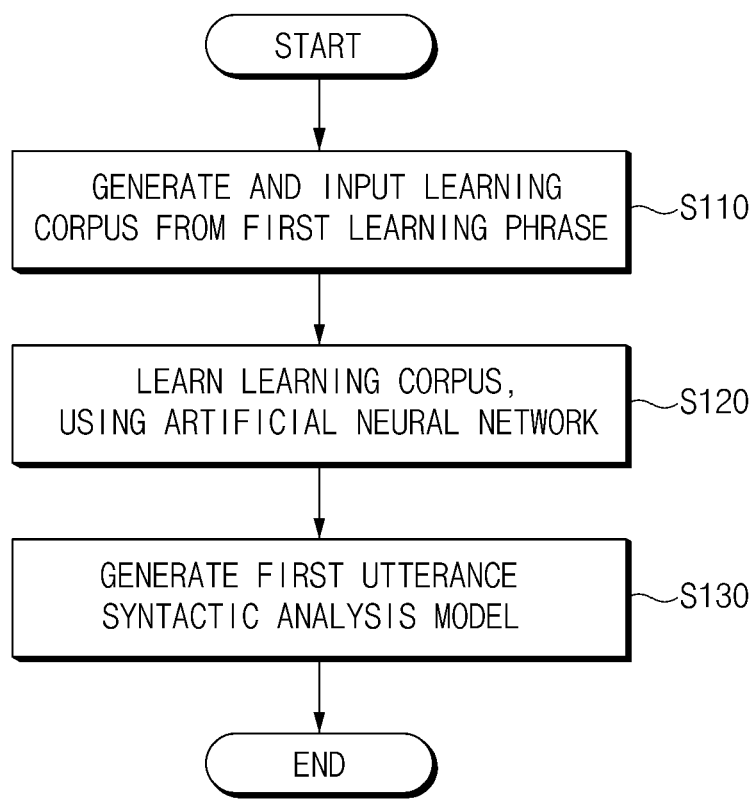
FIG. 3 is a flowchart illustrating a method for forming a first utterance syntactic analysis model, according to an embodiment of the present disclosure.

FIG. 3 is a flowchart illustrating a method for forming a first utterance syntactic analysis model, according to an embodiment of the present disclosure.

The learning device 120 may generate a learning corpus from a first learning phrase and then may input the generated learning corpus into the input layer 121 (S110). Herein, the first learning phrase may include a sentence or word for generating the learning corpus and may also include the uttered phrase from a user. Furthermore, the first learning phrase may include sentences, words, or the like that is capable of being used in a specific field set by a designer.

The learning device 120 may learn the learning corpus, using an artificial neural network (S120). In addition, the learning device 120 may generate a first utterance syntactic analysis model by learning the learning corpus (S130).

The learning device 120 may learn a sentence or a word that is capable of being used in a specific field set by a designer by performing the operations of S110 to S130.

Figure 4:
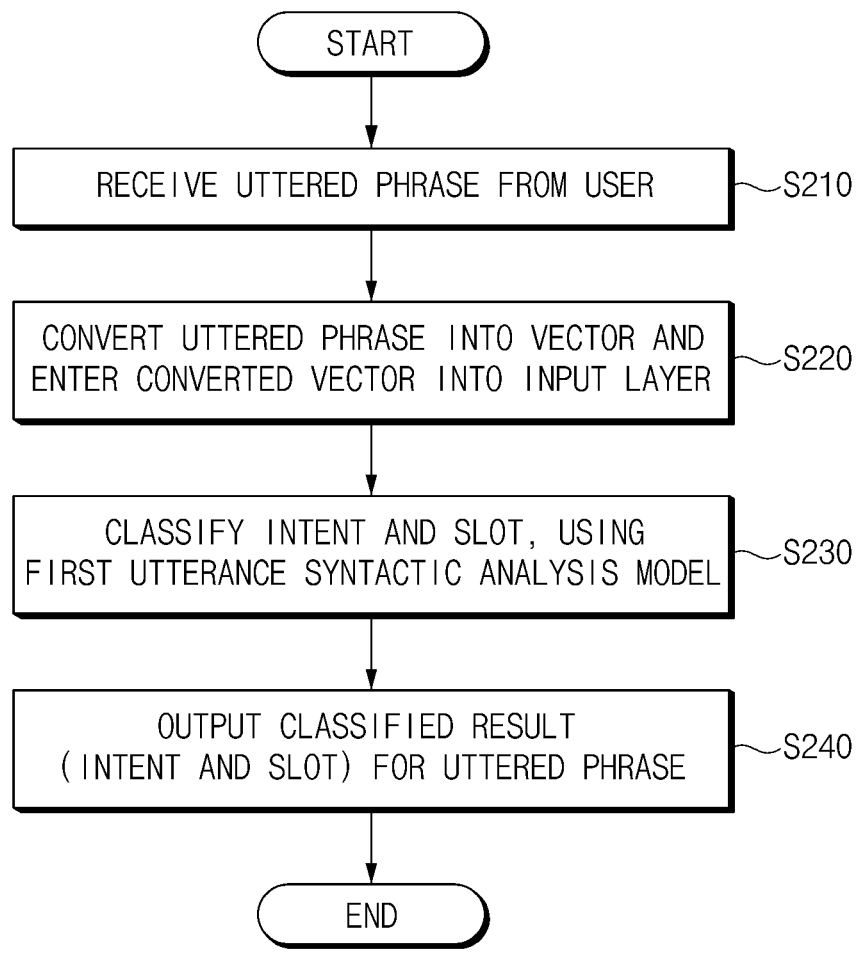
FIG. 4 is a flowchart illustrating a syntactic analysis method using a first utterance syntactic analysis model, according to an embodiment of the present disclosure.

FIG. 4 is a flowchart illustrating a syntactic analysis method using a first utterance syntactic analysis model, according to an embodiment of the present disclosure.

As illustrated in FIG. 4, the input device 110 may receive an uttered phrase from a user (S210). The learning device 120 may convert the phrase entered to the input device 110 into a vector value and may enter the converted value into the input layer 121 (S220). In S220, the learning device 120 may map a word forming the uttered phrase to a vector indicating the corresponding word and may convert the uttered phrase into the vector indicating the corresponding word. For example, the learning device 120 may convert the uttered phrase into the vector through one-hot encoding, Word2Vec, GloVe, FastText, or the like.

The learning device 120 may classify utterance intent of the user and a slot for the uttered phrase, using the first utterance syntactic analysis model generated in S130 (S230). Furthermore, the learning device 120 may output the classified utterance intent of the user and the classified slot through the intent output layer and the slot output layer, respectively (S240).

The learning device 120 may output the utterance intent of the user and the slot through the first utterance syntactic analysis model generated as the result of learning a sentence or word, which is capable of being used in a specific field set by a designer, by performing the operations S210 to S240. That is, because the learning device 120 outputs the utterance intent of the user and the slot through a first utterance syntactic analysis model, the learning device 120 may output the utterance intent of the user and the slot with respect to only the sentences or words that are capable of being used within a specific field set by the designer.

According to an embodiment, the learning device 120 may output the analysis result for the uttered phrase as shown in Table 1.

TABLE 1

| Uttered phrase | Analysis result | |
|---|---|---|
| (1) Making a call to Hong Gil Dong | Utterance intent of a user Making a call | Slot Hong Gil Dong = counterpart for outgoing call |
| (2) What's the weather today? | Utterance intent of a user — | Slot — |

For example, when the specific field set by the designer is 'phone', the learning device 120 may classify the utterance intent of the user and the slot through the first utterance syntactic analysis model with respect to the uttered phrase (1). However, when uttered phrase (2) does not include the sentence or word in the specific field set by the designer, the learning device 120 may not classify the utterance intent of the user and the slot through the first utterance syntactic analysis model. Accordingly, the learning device 120 may form a second syntactic analysis model to classify the utterance intent of the user and the slot with respect to the uttered phrase (2) and may allow the phrase including a sentence or word, which is out of the specific field set by the designer, to be classified as the utterance intent of the user and the slot.

Figure 5:
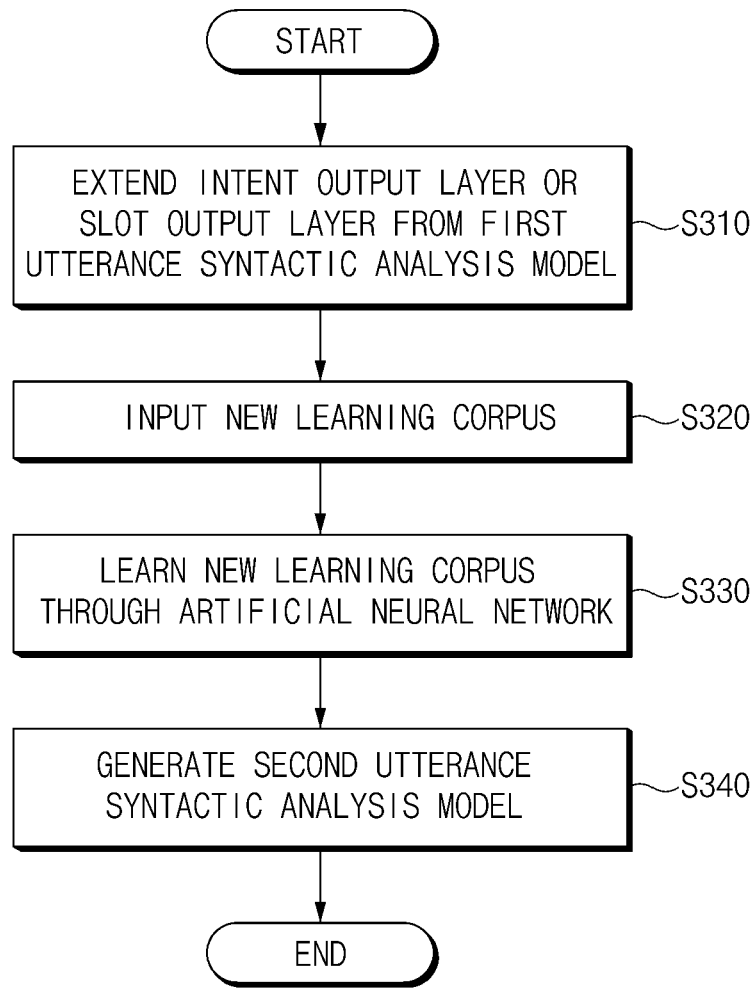
FIG. 5 is a flowchart illustrating a method for forming a second utterance syntactic analysis model, according to an embodiment of the present disclosure.

FIG. 5 is a flowchart illustrating a method for forming a second syntactic analysis model, according to an embodiment of the present disclosure.

As illustrated in FIG. 5, the learning device 120 may extend the intent output layer or the slot output layer from the first utterance syntactic analysis model (S310). In S310, the learning device 120 may extend an intent output layer by adding a neuron based on a user's utterance intent to be classified from the uttered phrase. Moreover, the learning device 120 may extend a slot output layer by adding a neuron based on a slot to be classified from the uttered phrase.

The learning device 120 may input a new learning corpus into the input layer 121 (S320). Herein, the new learning corpus may include some information extracted from the learning corpus generated in S110 and a learning corpus for learning the neuron added in S310. The learning device 120 may learn a new learning corpus, using an artificial neural network (S330). In addition, the learning device 120 may generate a second utterance syntactic analysis model by learning the new learning corpus (S340).

The learning device 120 may learn a sentence or a word that is capable of being used even in a field other than the specific field set by a designer by performing the operations of S310 to S340.

Figure 6:
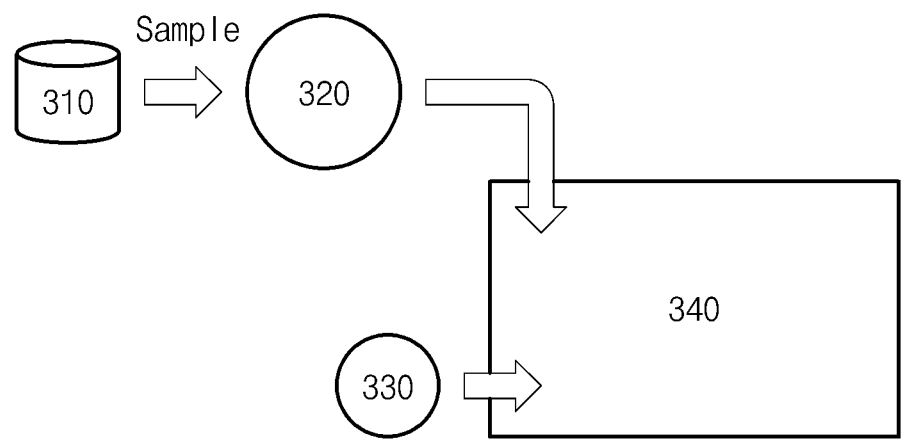
FIG. 6 is a diagram schematically illustrating a configuration of a new learning corpus, according to an embodiment of the present disclosure.

FIG. 6 is a diagram schematically illustrating a configuration of a new learning corpus, according to an embodiment of the present disclosure.

As shown in FIG. 6, a new learning corpus 340 may include some information 320 extracted from a learning corpus 310 generated in S110 and a learning corpus 330 for learning the neuron added in S310.

Figure 7:
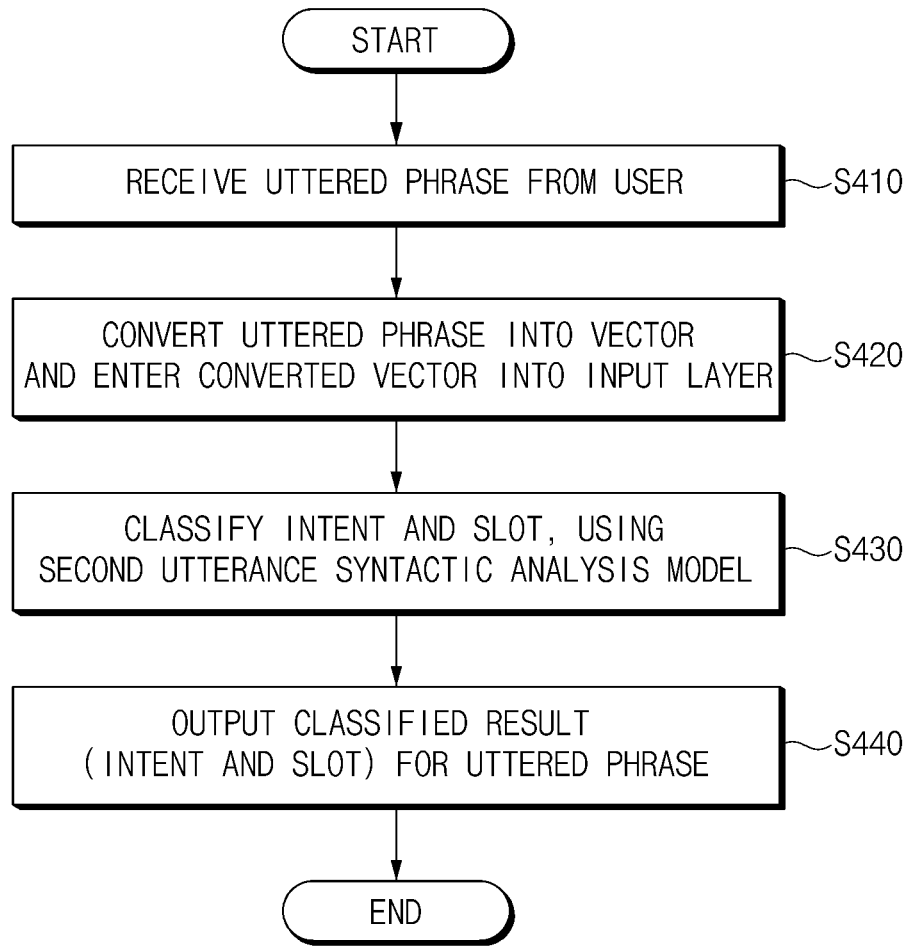
FIG. 7 is a flowchart illustrating a syntactic analysis method using a second utterance syntactic analysis model, according to an embodiment of the present disclosure.

FIG. 7 is a flowchart illustrating a syntactic analysis method using a second syntactic analysis model, according to an embodiment of the present disclosure.

As illustrated in FIG. 7, the input device 110 may receive an uttered phrase from a user (S410). The learning device 120 may convert the phrase entered to the input device 110 into a vector value and may enter the converted value into the input layer 121 (S420). In S420, the learning device 120 may map a word forming the uttered phrase to a vector indicating the corresponding word and may convert the uttered phrase into the vector indicating the corresponding word. For example, the learning device 120 may convert the uttered phrase into the vector through one-hot encoding, Word2Vec, GloVe, FastText, or the like.

The learning device 120 may classify an utterance intent of the user and a slot for the uttered phrase, using the second utterance syntactic analysis model generated in S340 (S430). Furthermore, the learning device 120 may output the classified utterance intent of the user and the classified slot through the extended intent output layer 123 and the extended slot output layer 124, respectively (S440).

The learning device 120 may output the utterance intent of the user and the slot through the second utterance syntactic analysis model generated as the result of learning a sentence or word, which is capable of being used other than the specific field set by a designer, by performing the operations S410 to S440. That is, because the learning device 120 outputs the utterance intent of the user and the slot through the second utterance syntactic analysis model, the learning device 120 may output the utterance intent of the user and the slot even with respect to the sentences or words that are capable of being used other than the specific field set by the designer.

According to an embodiment, the learning device 120 may output the analysis result for the uttered phrase as shown in Table 2.

TABLE 2

| Uttered phrase | Analysis result | |
|---|---|---|
| (1) Making a call to Hong Gil Dong | Utterance intent of a user Making a call | Slot Hong Gil Dong = counterpart for outgoing call |
| (2) What's the weather today? | Utterance intent of a user Weather check | Slot Today = date |
| (3) How is the weather in Seoul this evening? | Utterance intent of a user Weather check | Slot Today = date |

For example, when the specific field set by the designer is 'phone', the learning device 120 may classify the utterance intent of the user and the slot through the first utterance syntactic analysis model with respect to the uttered phrase (1). In addition, the learning device 120 may form a second syntactic analysis model to classify the utterance intent of the user and the slot with respect to the uttered phrase (2) and may allow the phrase including a sentence or word, which is out of the specific field set by the designer, to be classified as the utterance intent of the user and the slot.

However, in the case of the uttered phrase (3), the learning device 120 may classify the utterance intent of the user through the second utterance syntactic analysis model but may not classify the slot in detail. Accordingly, according to an embodiment of the present disclosure, the learning device 120 may further add the neuron of the slot output layer to analyze the uttered phrase (3) in more detail. According to an embodiment, the learning device 120 may add the neuron of the slot output layer corresponding to the analysis item such that the uttered phrase is classified into further detailed analysis items. In addition, when the neuron of the slot output layer is added, the learning device 120 may perform operations S310 to S340 shown in FIG. 5 to allow the added neuron to be learned.

When the learning about the added neuron is completed, the learning device 120 may output the analysis result shown in Table 3.

TABLE 3

| Uttered phrase | Analysis result | |
|---|---|---|
| (3) How is the weather in Seoul this evening? | Utterance intent of a user Weather check | Slot Today = date Seoul = Region Evening = Time |

That is, as described in Table 2, before the neuron of the slot output layer is further added, the learning device 120 may classify the uttered phrase (3) as one slot (date). However, as described in Table 3, when the neuron of the slot output layer is further added, the learning device 120 may classify the uttered phrase (3) into three slots (date, region, and time) to allow the uttered phrase to be analyzed in more detail.

Figure 8:
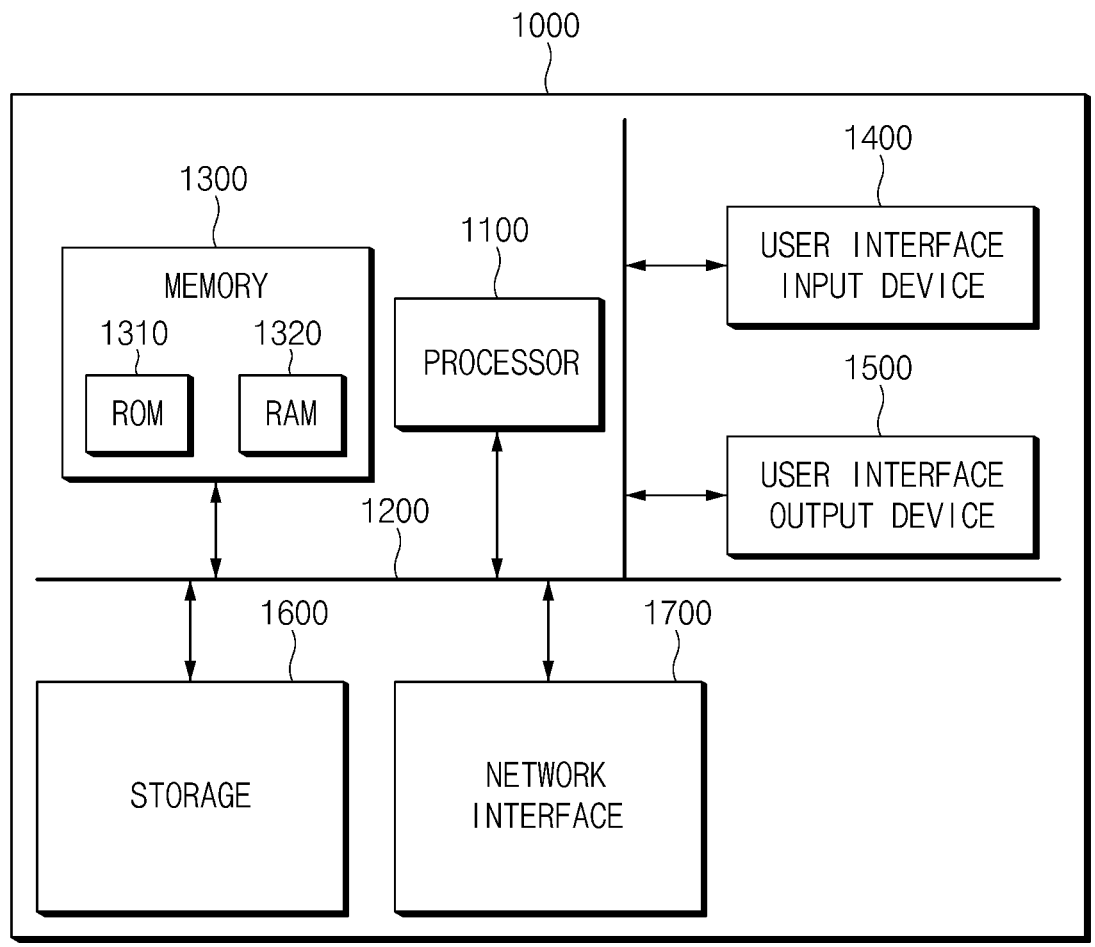
FIG. 8 is a block diagram illustrating a configuration of a computing system performing a method, according to an embodiment of the present disclosure.

FIG. 8 is a block diagram illustrating a configuration of a computing system performing a method, according to an embodiment of the present disclosure.

Referring to FIG. 8, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

According to an embodiment of the present disclosure, a syntactic analysis apparatus and a method therefor may quickly extend the function of the pre-generated syntactic analysis model by constructing and learning a new learning corpus for an extended output layer, thereby broadly classifying the intent and the slot for the phrase uttered from a user.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A syntactic analysis apparatus, the apparatus comprising:
an input device configured to receive a phrase uttered from a user; and
a learning device configured to perform
at least one or more of extension of an intent output layer for classifying an utterance intent of the user from the uttered phrase and extension of a slot output layer for classifying a slot including information of the phrase and
to extend a pre-generated utterance syntactic analysis model such that the uttered phrase is classified into the extended intent output layer and the extended slot output layer,
wherein the learning device performs learning using an artificial neural network based on a new learning corpus to extend the pre-generated utterance syntactic analysis model when the learning device does not classify the utterance intent of the user and the slot through the pre-generated utterance syntactic analysis model,
wherein the learning device is configured to:
extend the intent output layer by adding a first neuron based on the utterance intent of the user to be classified from the uttered phrase, and
extend the slot output layer by adding a second neuron based on the slot to be classified from the uttered phrase,
wherein the learning device is configured to extend the pre-generated utterance syntactic analysis model in a hidden layer,
wherein the learning device is configured to extend respectively the intent output layer and the slot output layer each separately from the hidden layer, and wherein the learning device further includes an input layer into which a vector value obtained by converting the uttered phrase is entered.

2. The apparatus of claim 1, wherein the new learning corpus includes a part of information extracted from a pre-generated learning corpus and a learning corpus for learning the added neuron.

3. The apparatus of claim 2, wherein the learning device is performed such that a learning speed of the added neuron among a plurality of neurons included in the intent output layer is faster than a learning speed of a pre-generated neuron.

4. The apparatus of claim 1, wherein the learning device performs learning based on the new learning corpus to extend the pre-generated utterance syntactic analysis model.

5. The apparatus of claim 4, wherein the new learning corpus includes a part of information extracted from a pre-generated learning corpus and a learning corpus for learning the added neuron.

6. A syntactic analysis method, the method comprising:
receiving, by an input device, a phrase uttered from a user;
performing, by a learning device, at least one or more of extension of an intent output layer for classifying an utterance intent of the user from the uttered phrase and extension of a slot output layer for classifying a slot including information of the phrase; and
extending, by a learning device, a pre-generated utterance syntactic analysis model such that the uttered phrase is classified into the extended intent output layer and the extended slot output layer, wherein the extending of the pre-generated utterance syntactic analysis model includes performing learning using an artificial neural network based on a new learning corpus to extend the pre-generated utterance syntactic analysis model when the learning device does not classify the utterance intent of the user and the slot through the pre-generated utterance syntactic analysis model,
wherein the learning device is configured to:
extend the intent output layer by adding a first neuron based on the utterance intent of the user to be classified from the uttered phrase, and
extend the slot output layer by adding a second neuron based on the slot to be classified from the uttered phrase,
wherein the learning device is configured to extend the pre-generated utterance syntactic analysis model in a hidden layer,
wherein the learning device is configured to extend respectively the intent output layer and the slot output layer each separately from the hidden layer, and
wherein the learning device further includes an input layer into which a vector value obtained by converting the uttered phrase is entered.

7. The method of claim 6, wherein the new learning corpus includes a part of information extracted from a pre-generated learning corpus and a learning corpus for learning the added neuron.

8. The method of claim 7, wherein the extending of the pre-generated utterance syntactic analysis model includes:
performing learning such that a learning speed of the added neuron among a plurality of neurons included in the extended intent output layer is faster than a learning speed of a pre-generated neuron.

9. The method of claim 6, wherein the new learning corpus includes a part of information extracted from a pre-generated learning corpus and a learning corpus for learning the added neuron.

* * * * *